Figure 1:
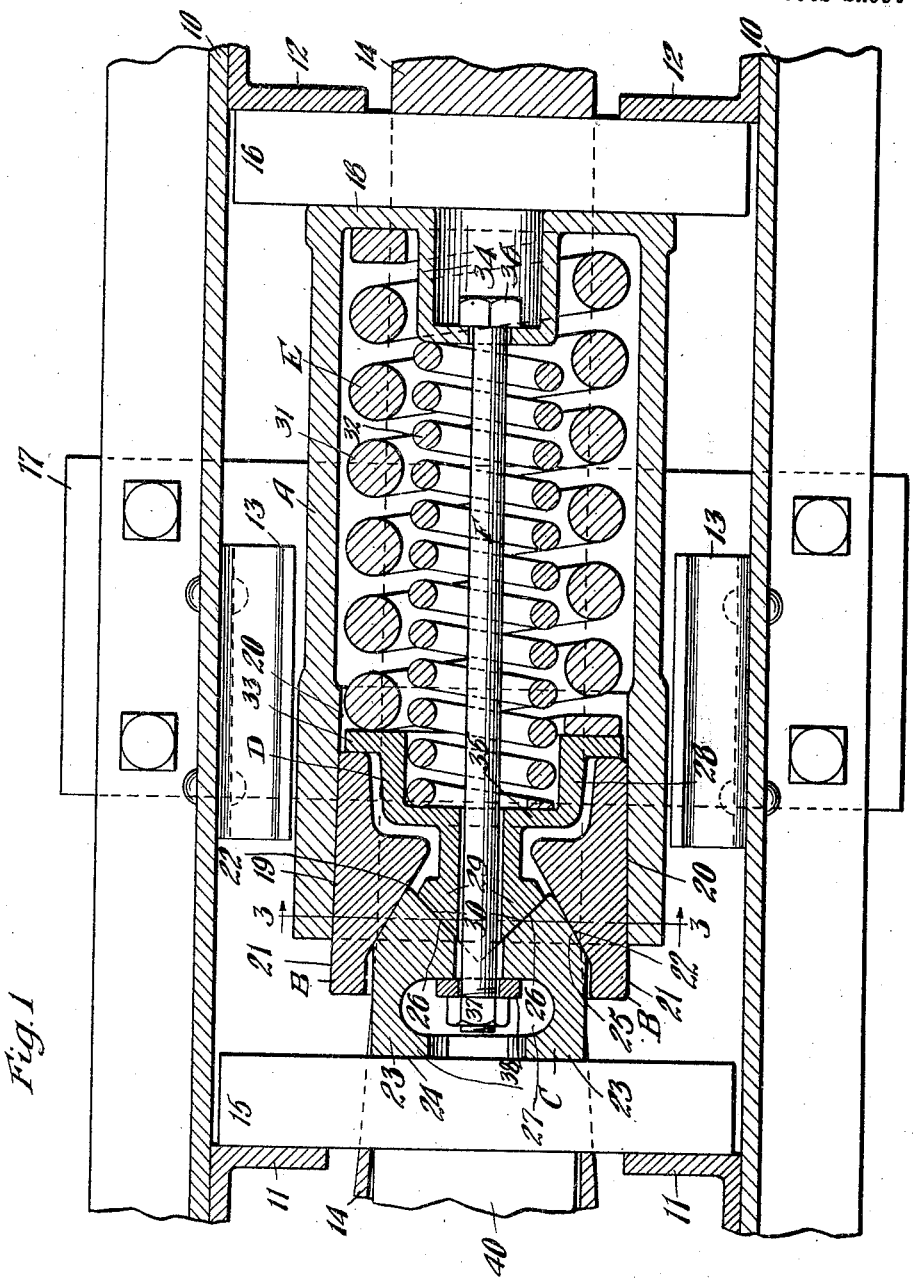

March 15, 1927.  
J. F. O'CONNOR  
1,620,677  
FRICTION SHOCK ABSORBING MECHANISM  
Filed Feb. 12, 1923  
2 Sheets-Sheet 1

Witnesses  
Wm. Geiger

Inventor  
John F. O'Connor  
By George J. Haight  
His Atty.

March 15, 1927.  
J. F. O'CONNOR  
1,620,677  
FRICTION SHOCK ABSORBING MECHANISM  
Filed Feb. 12, 1923  
2 Sheets-Sheet 2
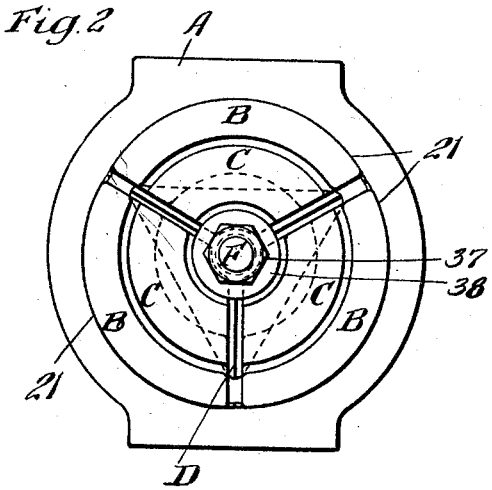
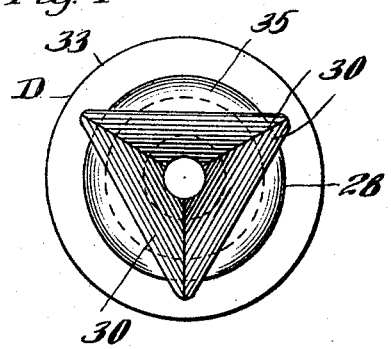
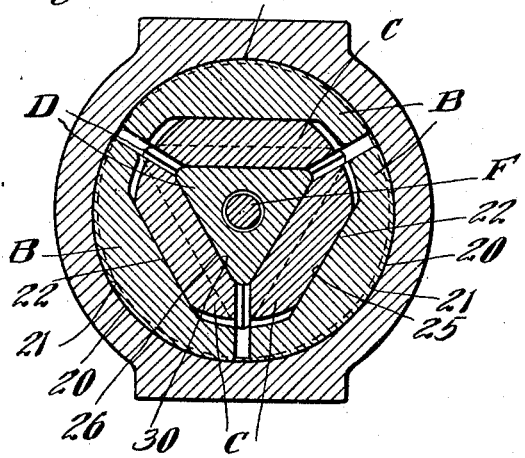
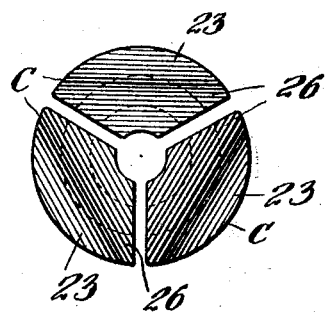
Witnesses  
Wm. Geiger
Inventor  
John F. O'Connor  
By George I. Haight  
His Atty.

Patented Mar. 15, 1927.

1,620,677

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed February 12, 1923. Serial No. 618,449.

This invention relates to improvements in friction shock absorbing mechanisms.

One object of the invention is to provide a high capacity friction shock absorbing mechanism, especially designed for railway draft riggings and wherein also is insured easy and certain release.

A more specific object of the invention is to provide a mechanism of the character indicated, having a wedging system wherein relatively blunt angle wedging faces may be used to insure release, and wherein also the elements of the wedging system are so associated and operated that any tendency toward excessive expansive action of the wedge system with relation to the shell, which might otherwise result in bursting of the latter, is compensated for by the action of the blunt angle wedging faces.

Other objects and advantages of the invention will more clearly appear from the description and claims hereinafter following.

In the drawings forming a part of this specification, Fig. 1 is a horizontal, longitudinal sectional view of a portion of a railway draft rigging showing my improvements in connection therewith. Fig. 2 is a front end elevational view of the friction shell and wedges. Fig. 3 is a transverse sectional view corresponding substantially to the line 3—3 of Fig. 1. Fig. 4 is a front end elevational view of the inner wedge. And Fig. 5 is a rear end elevational view of the sectional outer wedge.

In said drawings, 10—10 denotes channel draft sills of a railway car provided on the inner faces thereof with front stop lugs 11, rear stop lugs 12 and friction shell guiding members 13. A portion of the draw-bar is indicated at 40 and has connected thereto the hooded yoke 14. The shock absorbing mechanism proper, together with the front follower 15 and the rear follower 16, are contained within the yoke. The yoke and the associated movable parts of the shock absorbing mechanism are held in operative position by a detachable saddle plate 17.

The improved shock absorbing mechanism proper, as shown, comprises a combined friction shell and spring cage casting A; an annular series of three friction wedge shoes B—B—B; a sectional outer wedge C; a combined inner wedge and spring follower D; a spring resistance E; and a retainer bolt F.

The combined friction shell and spring cage A is of cylindrical form, closed at the rear end by the end wall 18, abutting the rear follower 16. The shell A is provided with a substantially cylindrical bore 19. The inner wall of the shell at the outer end of the bore 19 is provided with three, slightly inwardly converging, cylindrical friction surfaces 20. Upon reference to Fig. 1 it will be evident, that the friction shell A is held in central position between the draft sills 10 by the guide members 13.

The combined friction shoes and wedges B are three in number, as clearly shown in Figs. 2 and 3, and are arranged in an annular series. Each of the combined wedges and friction shoes B is provided with an exterior cylindrical face 21 adapted to slide on one of the cylindrical friction surfaces 20 of the friction shell A, and wedge face 22 on the inner side thereof adapted to co-act with the sectional outer wedge C. The wedge faces 22 of the combined wedge and friction shoes converge inwardly and are arranged at a keen wedging angle with reference to the longitudinal axis of the shock absorbing mechanism. As clearly shown in Fig. 3, the combined wedges and friction shoes B are spaced apart circumferentially of the shell a proper distance to permit of their relative approach during the inward movement along the inwardly converging friction surfaces 20 of the shell A.

The sectional outer edge wedge C is divided along radial lines and comprises three wedge sections 23. The wedge sections 23 are of similar construction each having a flat outer end face 24 adapted to abut the front follower 15, an outer flat wedge face 25 adapted to co-act with the wedge face 22 of one of the friction shoes B and an inner flat wedge face 26, adapted to co-act with the combined inner wedge spring follower D. The flat wedge face 25 which co-acts with the flat wedge face 22 of the combined wedge and friction shoe B extends at a relatively keen wedging angle with reference to the longitudinal axis of the mechanism, and the flat wedge face 26 which co-acts with the inner wedge D extends at a relatively blunt wedging angle with reference to the longitudinal axis of the mechanism. As clearly shown in Fig. 1, each of the sectional wedge elements 23 is recessed on the inner side thereof as indicated at 27 for a purpose hereinafter described.

The combined inner wedge and spring follower D is in the form of a hollow cap 28 provided with a centrally arranged forwardly projecting wedge member 29 rigid therewith. The combined wedge and spring follower D is provided with an annular flange 33 at the rear end thereof adapted to engage with the inner ends of the wedge shoes B and act as an abutment for the spring resistance. The wedge member 29 is provided with three outwardly converging flat wedge faces 30. Each of the wedge faces 30 extends at a blunt wedging angle with reference to the longitudinal axis of the mechanism and is adapted to co-act with an inner flat wedge face 26 of one of the wedge sections 23 of the outer wedge C. As shown in Figs. 3 and 4, the inner wedge member 29 is of triangular cross section with the apices of the triangle co-inciding with the radial lines of division of the sectional outer wedge C and the combined wedge and friction shoes B.

The spring resistance E comprises an outer, relatively heavy, coiled spring 31 and an inner, relatively lighter, coiled spring 32, the spring 31 being interposed between the rear wall 18 of the friction shell and the flange 33 of the combined wedge and spring follower D, and the spring 32 being interposed between an inwardly projecting hollow boss 34 on the end wall 18 of the friction shell and the outer wall 35 of the cap portion 28 of the combined wedge and spring follower D.

The parts of the mechanism are held in assembled relation and under initial compression by the retainer bolt F extending through the inner spring 32 and alined recesses in the combined wedge and spring follower D and the outer wedge C, having one end thereof anchored to the rear end of the friction shell by means of the head 36 and the other end anchored to the outer sectional wedge C by means of the nut 37 engaging the washer 38 abutting the rear walls of the recesses 27 of the wedge sections 23.

The operation of my improved shock absorbing mechanism is as follows, assuming a compression stroke of the mechanism. The sectional outer wedge C will be forced inwardly relatively to the friction shell A, thereby effecting a wedging action between the same and the wedge friction shoes B, there being substantially no relative movement between the relatively blunt wedge faces 26 and 30 of the sectional outer wedge C and the combined wedge and spring follower D, respectively. As the compression of the mechanism is continued, the wedge shoes B will be moved inwardly of the shell along the inwardly converging friction surfaces 20 thereof, thereby effecting a radial movement toward the axis of the gear, of the friction shoes and the wedge sections 23 of the outer sectional wedge C. During this inward movement, the relatively blunt wedge faces 26 of the wedge sections 23 will move inwardly toward the axis of the gear, sliding on the blunt wedge faces 30 of the combined inner wedge and spring follower D, thereby forcing the latter rearwardly with reference to the shell, effecting an additional compression of the spring resistance and moving the flanges 33 out of contact with the rear ends of the friction shoes B. While the mechanism is being compressed, the friction shell will be expanded slightly by the wedging action, thereby, setting up a lateral tension therein. It will be evident that any tendency toward excessive expansive action of the wedge system with relation to the shell, is compensated for by the inward movement of the spring resisted inner wedge D relative to the outer wedge C, and the resulting contraction of the latter. The danger of bursting the friction shell by excessive wedging pressure is thus completely avoided.

Upon removal of the actuating pressure the spring resistance will act to first move the combined wedge and spring follower forwardly, thereby releasing the sectional wedge C. It will be evident that, due to the bluntness of the wedge faces 26 and 30, and the inward pressure on the wedge sections exerted by the contraction of the shell, the wedge C is held under light pressure, against the combined wedge and spring follower D, reducing resistance of the wedge shoes and effecting an easy release of the mechanism. After the wedging pressure has been relieved, upon further forward movement of the combined wedge and spring follower D, the flange 33 thereof will engage with the rear ends of the wedge friction shoes B and move the same outwardly of the shell and restore all parts to normal position.

The blunt and keen angles of the wedges and wedge shoes may be varied as desired, but the angularity of the wedge faces 22 and 25 is preferably 30° and the angularity of the wedge faces 26 and 30 is preferably 45°, with reference to the longitudinal axis of the gear.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction shell having inwardly converging friction surfaces on the interior thereof; of a friction generating wedge system co-operable with the shell friction surfaces, said system comprising, a contractible wedge pressure-transmitting means, a plurality of wedge friction shoes having wedge faces coacting with said wedge pressure-transmitting means and said shell friction surfaces, a central wedge, said wedge and wedge pressure transmitting means having coacting wedge faces with said contractible wedge pressure-transmitting means, all of said wedge faces being intersected by a common transverse plane; and a main spring resistance opposing inner movement of said central wedge.

2. In a friction shock absorbing mechanism, the combination with a friction shell having inwardly converging friction surfaces on the interior thereof; of a plurality of friction wedge shoes co-operable with said shell; a spring resistance; an outer contractible pressure transmitting member having wedge faces co-acting with said friction wedge shoes; and an inner wedge having wedge faces cooperating with said outer member, and interposed between the latter and the the spring resistance, said inner wedge for the entire length thereof being disposed between said first named wedge faces.

3. In a friction shock absorbing mechanism, the combination with a friction shell having inwardly converging friction surfaces on the interior thereof; of a plurality of friction wedge shoes slidable on said shell friction surfaces, each shoe having a wedge face extending at a relatively keen wedging angle with reference to the longitudinal axis of the mechanism; a main spring resistance; an outer contractible wedge provided with a set of wedge faces extending at relatively keen wedging angles with reference to the longitudinal axis of the mechanism and a second set of wedge faces extending at relatively blunt angles with respect to said longitudinal axis, said first named set of wedge faces being adapted to co-act with the wedge faces of said shoes; an inner wedge provided with a set of wedge faces extending at relatively blunt angles with reference to said axis, and adapted to co-act with the blunt angle wedge faces of said outer wedge, said inner wedge being interposed between the said outer wedge and the spring resistance, all of said wedge faces being intersected by a common transverse plane; and a main spring resisting inward movement of said inner wedge.

4. In a friction shock absorbing mechanism, the combination with a friction shell having inwardly converging friction surfaces on the interior thereof; of a plurality of friction wedge shoes slidable on the shell friction surfaces, each shoe having a keen wedge acting face on the inner side thereof; a wedge pressure transmitting means including a plurality of wedge elements, each of said elements being provided with a pair of wedge faces, one face of each pair being relatively keen and co-acting with the wedge faces of one of said shoes and the other face of each pair being disposed at a relatively blunt angle to the longitudinal axis of the mechanism; an inner central wedge provided with a plurality of wedge faces correspondingly inclined to and adapted to cooperate with the last named wedge faces; and a main spring resistance, said inner wedge being interposed between said wedge pressure transmitting means and the spring resistance, said spring resistance opposing inward movement of said shoes and inner wedge.

In witness that I claim the foregoing I have hereunto subscribed my name this 8th day of February, 1923.

JOHN F. O'CONNOR.